United States Patent Office 3,509,187
Patented Apr. 28, 1970

3,509,187
PROCESS FOR PREPARING AN ESTER IN THE PRESENCE OF NaBr, NaI, KCl, KBr, KI, KF AND SrCl$_2$
John G. McNulty and William L. Walsh, Glenshaw, Pa., assignors to Gulf Research & Development Company, Pittsburgh, Pa., a corporation of Delaware
No Drawing. Filed June 1, 1964, Ser. No. 371,838
Int. Cl. C07c 69/22; C11c 3/00
U.S. Cl. 260—410.9                                11 Claims

ABSTRACT OF THE DISCLOSURE

A process for preparing an ester which comprises reacting a monobasic organic acid with an organic halide, which can be a primary straight or branched chain alkyl halide, a primary cyclic alkyl halide, a primary straight or branched chain olefinic halide or an aromatic halide, in the presence of NaBr, NaI, KCl, KBr, KI, KF or SrCl$_2$.

---

This invention relates to a process for preparing an ester which comprises reacting a monobasic organic acid with an organic halide selected from the group consisting of primary straight and branched chain alkyl halides, primary cyclic alkyl halides, primary straight and branched chain olefinic halides and aromatic halides in the presence of a specific catalyst therefor. The esters obtained herein can be employed as solvents for paints, resins, etc.; as plasticizers for resins, rubbers, etc.; or they can be hydrolyzed with water to obtain the corresponding alcohols.

The organic acids employed herein are preferably saturated straight chain aliphatic monobasic acids having from two to 30 carbon atoms, preferably from two to 22 carbon atoms, and saturated branched chain aliphatic monobasic acids having from two to 30 carbon atoms, preferably from two to 22 carbon atoms. To react with the monobasic organic acid defined above to produce the desired ester in accordance with the process defined herein there must be employed an organic halide selected from the group consisting of primary straight and branched chain alkyl halides having from one to 30 carbon atoms, preferably from one to 22 carbon atoms, primary cyclic alkyl halides having from four to 22 carbon atoms, preferably from four to 12 carbon atoms, primary straight and branched chain olefinic halides having from three to 22 carbon carbon atoms, preferably from six to 22 carbon atoms, and aromatic halides having from six to 30 carbon atoms, preferably from six to 22 carbon atoms. Specific examples of monobasic organic acids, primary straight and branched chain alkyl halides, primary cyclic alkyl halides, primary straight and branched chain olefinic halides and aromatic halides that can be employed herein correspond to those defined in copending application Ser. No. 333,624, filed Dec. 26, 1963, and assigned to the same assignee as the instant application.

The monobasic organic acid and the organic halide defined above are reacted, in accordance with the procedure of the invention defined herein, in the presence of a catalyst selected from the group consisting of NaBr, NaI, KCl, KBr, KI, KF and SrCl$_2$. By "catalyst" we mean only to include only those substances which by virtue of their presence in a chemical reaction affect the rate thereof, do not react with any of the materials in the reaction zone, and are recovered practically unchanged at the end of the reaction period. The amount of such catalyst that must be employed herein can be, for example, from about one to about 200 mol percent, preferably from about 10 to about 100 mol percent, relative to the organic acid employed. In the desired reaction while we prefer to employ the defined monobasic organic acid and the defined organic halide in approximately stoichiometric amounts, the molar proportions thereof can vary from about 10:1 to about 1:10.

In carrying out the reaction the defined reactants and the defined catalyst are merely brought together in any convenient manner. The temperature must be at least about 180° C., preferably at least about 220° C., in order to initiate and drive the reaction. In order to avoid the formation of decomposition or other undesirable products the temperature is maintianed below about 400° C., preferably below about 350° C. Pressure is not critical and can be, for example, from about 0 to about 3000 pounds per square inch gauge, preferably from about 0 to about 1200 pounds per square inch gauge. Reaction time can be, for example, from about one minute to about 40 hours, preferably from about 15 minutes to about three hours.

During the course of the reaction an ester and a hydrogen halide are produced, and since the hydrogen halide is in vapor form it is easily removed from the reaction zone and can be recovered. The reaction mixture at this point comprises essentially desired ester, catalyst and in the event the reaction has not been permitted to go to completion one or both of the original reactants. Desirably the catalyst is removed from the reaction mixture in any

TABLE I

| Run No. | Acid | Mols | Organic halide | Mols | Catalyst | Mols | Reaction time, minutes | Temperature, °C. | Ester, mol percent based on alkyl halide |
|---|---|---|---|---|---|---|---|---|---|
| 1 | Pelargonic | 0.0572 | n-Octyl bromide | 0.0116 | None | None | 60 | 236–239 | 13.7 |
| 2 | do | 0.0572 | do | 0.0116 | KCl | 0.0268 | 60 | 235–241 | 26.9 |
| 3 | do | 0.0572 | do | 0.0116 | KBr | 0.0168 | 60 | 235–244 | 20.8 |
| 4 | do | 0.0572 | do | 0.0116 | KI | 0.012 | 60 | 240–247 | 23.6 |
| 5 | do | 0.0572 | do | 0.0119 | KF | 0.00086 | 60 | 235–250 | 28.2 |
| 6 | do | 0.0572 | do | 0.0116 | KF | 0.0344 | 35 | 250–280 | 96.5 |
| 7 | do | 0.0572 | do | 0.0199 | NaBr | 0.0194 | 60 | 230–241 | 26.0 |
| 8 | do | 0.0572 | do | 0.0116 | NaI | 0.0133 | 60 | 235–249 | 29.0 |
| 9 | do | 0.0572 | do | 0.0116 | SrCl$_2$ | 0.0082 | 60 | 237–249 | 41.7 |
| 10 | do | 0.0572 | n-Octyl chloride | 0.0180 | None | None | 120 | 221 | 3.1 |
| 11 | do | 0.0572 | do | 0.0120 | KBr | 0.0168 | 60 | 230–235 | 7.7 |
| 12 | do | 0.0572 | n-Octyl bromide | 0.0116 | NaCl | 0.0343 | 60 | 236–238 | 14.3 |
| 13 | do | 0.0572 | do | 0.0116 | BaCl$_2$ | 0.096 | 60 | 234–237 | 10.4 |
| 14 | do | 0.0572 | do | 0.0116 | PbCl$_2$ | 0.0072 | 60 | 234–239 | 14.6 |
| 15 | do | 0.0572 | do | 0.0119 | CaBr$_2$ | 0.020 | 60 | 185–208 | 8.0 |
| 16 | do | 0.0572 | s-Octyl chloride | 0.0234 | None | None | 60 | 207–215 | 1.9 |
| 17 | do | 0.0114 | do | 0.060 | do | None | 60 | 190 | 0 |
| 18 | do | 0.0114 | do | 0.060 | do | None | 420 | 195 | 0.6 |
| 19 | do | 0.0572 | do | 0.0234 | KCl | 0.0268 | 60 | 207–213 | 2.2 |
| 20 | do | 0.0572 | do | 0.0234 | SrCl$_2$ | 0.01 | 60 | 208–216 | 1.3 |
| 21 | do | 0.0572 | do | 0.0234 | SrCl$_2$ | 0.01 | 60 | 217–219 | 2.3 |
| 22 | do | 0.0602 | s-Octyl bromide | 0.0116 | None | None | 60 | 220–224 | 21.9 |
| 23 | do | 0.0572 | do | 0.0116 | SrCl$_2$ | 0.01 | 60 | 227–217 | 14.8 |
| 24 | do | 0.0572 | do | 0.0116 | NaBr | 0.0426 | 60 | 232 | 14.3 |
| 25 | do | 0.0572 | do | 0.0116 | KBr | 0.0335 | 60 | 237–239 | 19.9 |
| 26 | do | 0.0572 | do | 0.0116 | KF | 0.00086 | 60 | 203–218 | 26.3 | suitable manner, for example, by filtration. In the event unreacted reactants are present in the resulting reaction mixture, the resulting mixture is desirably subjected to a temperature of about 100° C. to about 250° C. and a pressure of about one millimeter of mercury to about 760 millimeters of mercury to remove overhead the unreacted reactants still present. Left behind after removal of catalyst and unreacted reactants is the desired ester.

The process described and claimed herein can further be illustrated by the following. Into a 75-milliliter test tube there was placed a monobasic acid, an organic halide and catalyst. The test tube was sealed with a rubber stopper containing a thermometer and a twelve-inch length of 10-millimeter tubing to act as an air condenser. The contents of the test tube were heated over a Bunsen burner for a definite reaction period. At the end of the reaction the catalyst was permitted to precipitate and the liquid organic product composition was determined by gas chromatographic analysis. However, if desired, the catalyst could have been separated from the reaction product and the remainder of the reaction product could be separated by distillation.

The advantages of preparing esters by reaction of the defined monobasic organic acids with the defined organic halides in the presence of the defined catalysts is apparent from a study of the data in Table I. Note that in Run No. 1 when the monobasic organic acid was reacted with n-octyl bromide in the absence of a catalyst the mol percent yield of the desired ester, octyl pelargonate, was only 13.7. Note, however, that when the reaction was carried out in the presence of catalytic amounts of NaBr, NaI, KCl, KBr, KI, KF and $SrCl_2$ the mol per cent yield of the desired ester was increased appreciably. Particularly good results were obtained when KF and $SrCl_2$ were employed as catalyst. In Run No. 10 when the monobasic organic acid was reacted with n-octyl chloride in the absence of a catalyst the mol percent yield of the desired ester was only 3.1. In Run No. 11 when the same reactants were brought together in the presence of catalytic amounts of KBr the mol percent yield of the desired ester was increased appreciably. Runs Nos. 12, 13, 14 and 15 show that the defined metal salts are unique in this instance, since other metal salts, some closely related thereto, namely NaCl, $BaCl_2$, $PbCl_2$ and $CaBr_2$, are not operative in catalyzing the desired esterification reaction. Runs Nos. 16, 17 and 18 show that a monobasic organic acid will react only slightly with a secondary alkyl chloride to form the desired ester. Even though in Runs Nos. 19, 20 and 21 KCl and $SrCl_2$, which were effective catalysts when the alkyl halide reactant was a normal alkyl halide, were employed, no improvement was noted in the reaction of the monobasic organic acid with a secondary alkyl chloride. Run No. 22 shows that a monobasic organic acid reacts well with a secondary alkyl bromide in the absence of a catalyst to form the desired ester. However, Runs Nos. 23, 24 and 25 show that the latter reaction is not improved, but in fact somewhat inhibited, by the presence of $SrCl_2$, NaBr or KBr, respectively, during the reaction.

Obviously, many modifications and variations of the invention, as hereinabove set forth, can be made without departing from the spirit and scope thereof, and therefore only such limitations should be imposed as are indicated in the appended claims.

We claim:
1. In the process wherein a monobasic aliphatic carboxylic organic acid having from 2 to 30 carbon atoms is reacted with an alkyl halide having from 1 to 30 carbon atoms to obtain an ester corresponding to said monobasic organic acid and hydrogen halide, the improvement which comprises carrying out the reaction in the presence of a catalyst selected from the group consisting of NaBr, NaI, KCl, KBr, KI, KF and $SrCl_2$ at a temperature of about 180° to about 400° C.
2. The process of claim 1 wherein the reaction is carried out in the presence of KF.
3. The process of claim 1 wherein the reaction is carried out in the presence of KCl.
4. The process of claim 1 wherein the reaction is carried out in the presence of NaI.
5. The process of claim 1 wherein the reaction is carried out in the presence of NaBr.
6. The process of claim 1 wherein the reaction is carried out in the presence of $SrCl_2$.
7. The process of claim 1 wherein the organic halide is a primary straight chain alkyl halide.
8. The process of claim 1 wherein the organic halide is a primary straight chain alkyl chloride.
9. The process of claim 1 wherein the organic halide is a primary straight chain alkyl bromide.
10. The process of claim 1 wherein the organic halide is n-octyl bromide.
11. The process of claim 1 wherein the monobasic organic acid is pelargonic acid.

References Cited

Wertheim: Organic Chemistry (1951), pp. 93, 95 and 484.

LORRAINE A. WEINBERGER, Primary Examiner

E. J. GLEIMAN, Assistant Examiner

U.S. Cl. X.R.

260—493

UNITED STATES PATENT OFFICE
CERTIFICATE OF CORRECTION

Patent No. 3,509,187     Dated April 28, 1970

Inventor(s) John G. McNulty et al.

It is certified that error appears in the above-identified patent and that said Letters Patent are hereby corrected as shown below:

TABLE I, column 5 of Run No. 7, "0.0199" should read -- 0.0119 --.

Signed and sealed this 1st day of September 1970.

(SEAL)
Attest:

EDWARD M. FLETCHER, JR.
Attesting Officer

WILLIAM E. SCHUYLER, JR.
Commissioner of Patents